UNITED STATES PATENT OFFICE.

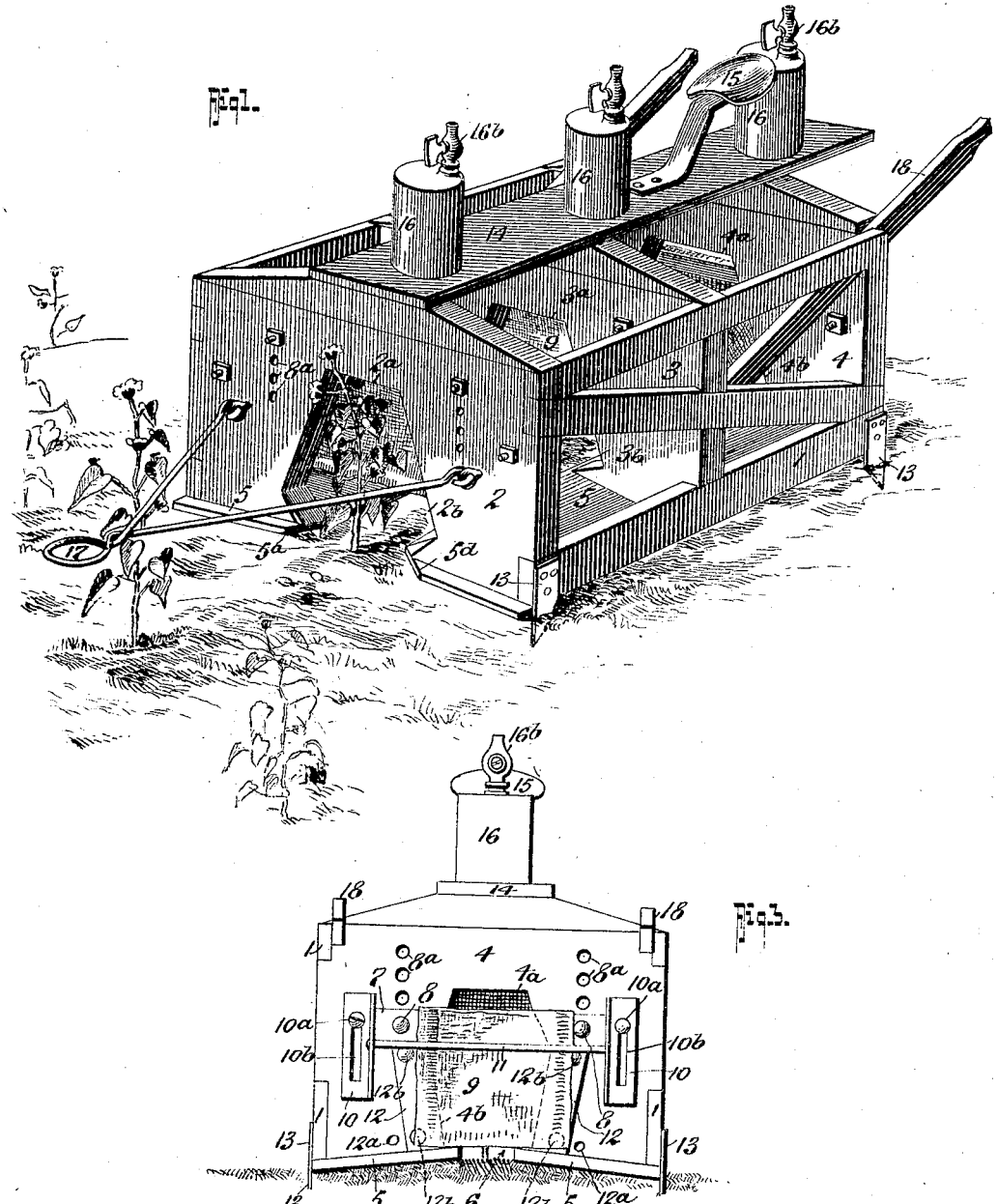

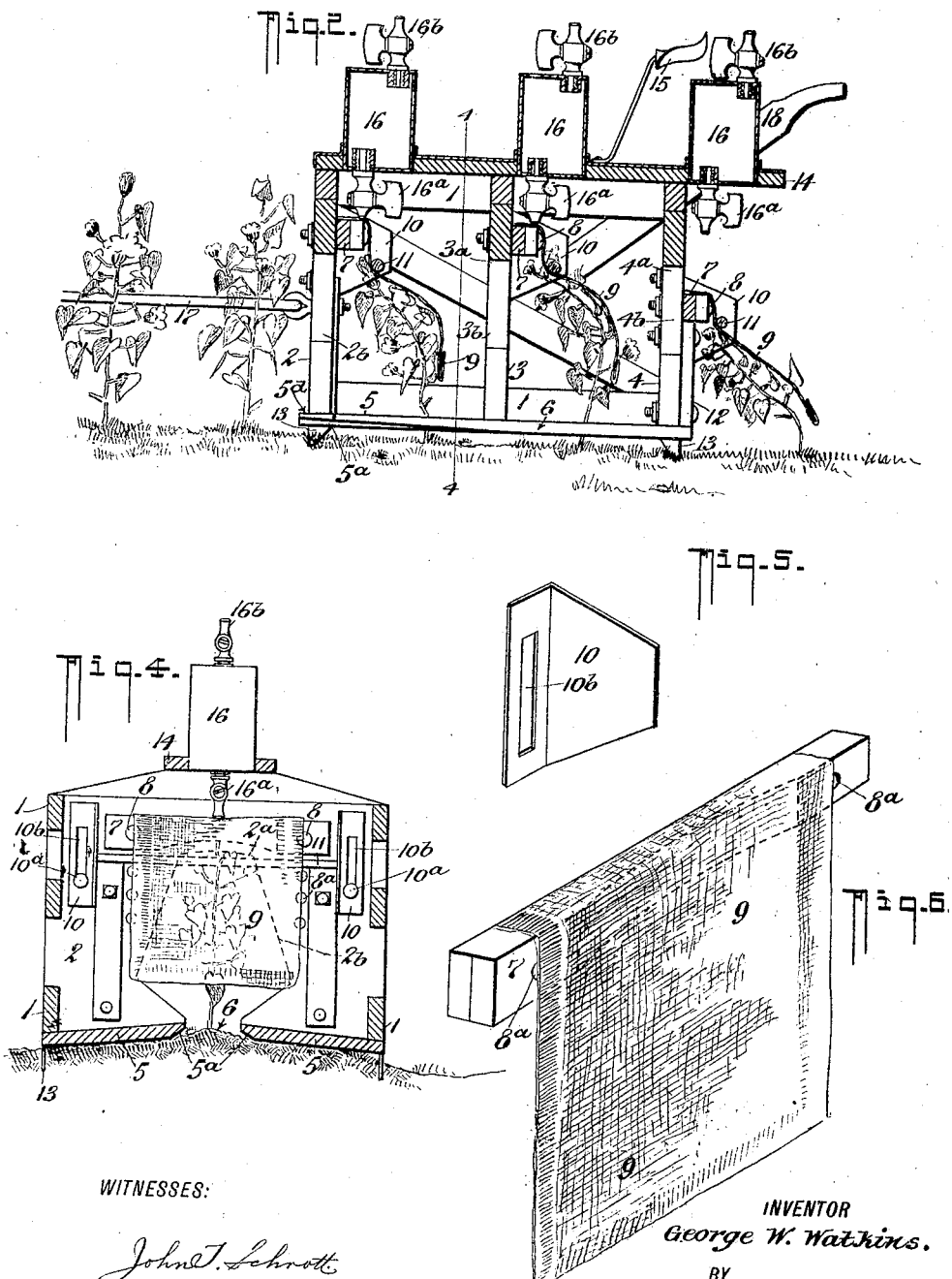

GEORGE W. WATKINS, OF ROSEBUD, TEXAS.

BOLL-WEEVIL EXTERMINATOR.

No. 876,612.   Specification of Letters Patent.   Patented Jan. 14, 1908

Application filed October 21, 1907. Serial No. 398,518.

*To all whom it may concern:*

Be it known that I, GEORGE W. WATKINS, residing at Rosebud, in the county of Falls and State of Texas, have invented certain new and useful Improvements in Boll-Weevil Exterminator, for which the following is a specification.

My invention relates to certain new and useful improvements in machines for exterminating boll weevils, and in its generic nature the invention embodies a machine which is adapted to pass over the cotton, the machine having passage-ways for the cotton to pass through as it is drawn over the field.
My invention also includes in its generic nature means for striking the cotton plant and bolls as the machine is drawn over the same and thus knock off the insect and its form, which drop either into the machine or under the same and when dropped under the machine the weight of my apparatus will crush the insect into oblivion.

My invention also includes means for spraying the cotton with chemicals in order to destroy the insects thereon, if so desired.

With other objects in view than have been hereinbefore specified, the invention also includes certain novel details of construction, combination and arrangement of parts, all of which will be first described in detail, then be specifically pointed out in the appended claims, reference being had to the accompanying drawings, in which:—

Figure 1, is a perspective view showing my invention applied for use. Fig. 2, is a central, vertical, longitudinal section thereof. Fig. 3, is a rear elevation of the machine showing the means whereby the parts can be adjusted to suit the various sized plants.
Fig. 4, is a section on the line 4—4 of Fig. 2. Fig. 5, is a detail perspective view of one of the adjustable rod carrying brackets hereinafter described. Fig. 6, is a similar view of one of the cloth carrying bars and its attached parts.

Referring now to the accompanying drawings, in which like letters and numerals of reference indicate like parts in all of the figures 1 designates the side portions of the main frame of the machine which are connected at intervals by the cross walls 2, 3 and 4, all of which are of like construction and to which the bottom boards 5 are secured, the bottom boards 5 having their front edges beveled, as at $5^a$ on their under side and being spaced apart to form a passage-way 6 there between, the passage-way 6 being wider at the front of the machine than at the rear and the bottom boards 5 are provided with diverging walls $5^d$ to form a flared entrant end or mouth to the machine.

Each cross wall 2, 3 and 4 is provided with an opening $2^a$, $3^a$ and $4^a$, respectively, the walls of which may be slightly beveled to be slightly wider at the front end of the wall as at $2^b$, $3^b$ and $4^b$ respectively, so that the plant will pass readily through the openings in the walls.

On the rear face of each of the walls 2, 3 and 4 is adjustably secured a cross bar 7, which is held in place by bolts 8 that pass through apertures $8^a$ in the cross walls, a series of such apertures $8^a$ being provided so that the bar 7 may be adjusted up or down, as desired. 9 designates a cloth or other suitable member secured to the bar 7 to form a flap and project through the openings in the walls 2, 3 and 4, respectively for a purpose which will presently appear.

10 designates bracket members adjustably secured to each wall 2, 3 and 4, by bolts $10^a$, which pass through a slot $10^b$ in the bracket members 10. A pair of bracket members are secured to each wall adjacent the ends of the bars 7 and the brackets of each pair are connected together by a cross rod 11 which is held at a distance of several inches to the rear of the bar 7.

The cloth flap 9 is held between the bar 7 and the rod 11, as shown, and for a purpose which will be presently explained.

12 designates adjustable bars which may be secured to each of the cross walls and by means of which the openings in the cross walls may be made less or greater, as conditions may require, adjusting apertures $12^a$ being provided in the walls to coöperate with the bolts $12^b$ that secure the bar 12 in place.

13 designates drag knives secured to the side walls 1 of the machine at each corner thereof and which project beyond the bottom of the machine to under the ground. The drag knives 13 serve to mark off the course of travel of the machine and also prevent lateral movement thereof so as to keep the machine from lateral movement as it is drawn over the plants.

The cross walls 2, 3 and 4 are connected by a top beam 14 to which the seat 15 of the rider may be secured, and the top beam 1 carries a plurality of fumigant retaining receptacles 16, which have outlets through valves 16ª between the receptacle and inlet valves 16ᵇ at the top of the receptacle, the valve outlets of the receptacle discharging onto the flaps 9 to saturate the same with fumigating solution and the outlet valves 16ª serve to regulate the amount of fumigating solution dropped onto the flaps 9. The inlet valves 16ᵇ serve to regulate the air supply to the receptacles as the fluid passes out through the outlet valves 16ª.

A draft beam 17 is attached to the front of the machine by means of which it can be drawn over the ground and handle members 18 may be also provided in case the operator desires to walk along as the machine is moved over the plants.

As the machine passes over the cotton, the cotton is passed through the opening in the wall 2, the plant being of greater height than the openings is bent over, as it were, until it passes through the opening, the rod 11 serving to hold the flap 9 against the leaves of the plant during its passage through the opening in the wall 2. The plant then passes in turn through the walls 3 and 4 in the same manner, it being understood that as the plant is passed through the machine it will be knocked and jarred to knock off the forms that have been effected by the weevil, as well as knock off any weevils which may be attached to the plant. The weight of the machine being in practice, about 300 pounds, serves to crush the forms and weevils that form under the machine and in so doing prevent the increase of the weevil.

As heat and sunshine are destructive to the weevil, the machine packs the ground solidly as it passes over the same and leaves a smooth surface, thus letting more sunshine under the plant while the smooth surface creates more heat to destroy the insect.

I have found that in spraying the cotton plant with chemicals with the ordinary hand sprayers while the cotton stood straight, that such spray had little or no effect on the weevil, as the chemicals would fall on the top of the leaves and be quickly consumed by the heat of the sun's rays, causing the leaves to blister, thus doing more injury to the plant than good, and in order to avoid this injurious action, I have designed my machine in such manner that the cotton plant will be bent over and the leaves turned with their under sides into contact with the flaps 9 which spreads the chemicals on the leaves on their under-sides where the chemicals will be most effective, and be protected from the sun's rays and thus not injure the plant. Furthermore, by spraying the chemicals on the under side of the leaves the weevil is more effectively exterminated since it usually makes its abode on the under-side of the leaf.

The rods 11 serve to keep the plant bent over while the chemicals are being applied to the same at all times. The operation and action of my machine, in detail, is as follows:

The uniform size of boll-worms is about 1 inch in length. They work on the grown bolls of the cotton plant and are very destructive thereto. As my machine passes over the cotton plant, the scent and effect of the chemicals causes the boll-worms to loosen their hold on the bolls, which are being "bumped" by the machine, as the machine passes over the same, thus knocking the boll-worms and affected bolls off, causing them to fall to the ground and to be crushed by the machine, or they will fall on the bottom of the machine toward the back thereof, from which they may be removed in any desired manner.

From the foregoing description, taken in connection with the accompanying drawings it is thought the complete construction, operation and numerous advantages of my apparatus will be readily apparent to those skilled in the art to which the invention appertains.

What I claim is:—

1. In a machine of the class described, a main frame including side bars and a series of transverse walls each having openings for the passage of the plant, combined with means for applying a fumigant to the leaves of the plant, substantially as shown and described.

2. In a machine of the class described, a main frame including side bars and a series of transverse walls each having openings for the passage of the plant, combined with means for applying a fumigant to the under-side of the leaves of the plants, substantially as shown and described.

3. A machine of the class described, comprising a main frame having sides and a bottom and transverse walls, said walls and said bottom having passage openings for the plant, means for adjusting the area of said openings, a bar carried by said transverse walls and adapted to be held across said openings, substantially as shown and described.

4. A machine of the class described, comprising a main frame having sides and a bottom and transverse walls, said walls and said bottom having passage openings for the plant, means for adjusting the area of said wall openings, a bar carried by said transverse walls and adapted to be held across said openings, and a rod held at the rear of said bar and across said openings, substantially as shown and described.

5. A machine of the class described, comprising a main frame having sides and a bottom and transverse walls, said walls and said bottom having passage openings for the plant, means for adjusting the area of said wall openings, a bar carried by said transverse walls, a rod held at the rear of said bar and across said openings, an absorbent cloth secured to said bar and passed between said bar and said rod, and means for moistening said cloth, substantially as shown and described.

6. In a machine of the class described, comprising a main frame consisting of side bars and a series of transverse walls, each having an opening for the passage of the plant, a bottom for said machine having a longitudinal passage there-through, adjustable brackets secured to one face of each of said transverse walls, a rod joining the brackets on each transverse wall and spaced from said wall, said rod projecting across the opening in said wall, substantially as shown and described.

7. In a machine of the class described, comprising a main frame consisting of side bars and a series of transverse walls, each having an opening for the passage of the plant, a bottom for said machine having a longitudinal passage there-through, adjustable brackets secured to one face of each of said transverse walls, a rod joining the brackets on each transverse wall and spaced from said wall, said rod projecting across the opening in said wall, and a flap carrying bar also secured to one face of said transverse wall to project across the opening thereof, substantially as shown and described.

8. In a machine of the class described, comprising a main frame consisting of side bars and a series of transverse walls, each having an opening for the passage of the plant, a bottom for said machine having a longitudinal passage there-through, adjustable brackets secured to one face of each of said transverse walls, a rod joining the brackets on each transverse wall and spaced from said wall, said rod projecting across the opening in said wall, a flap carrying bar also secured to one face of said transverse wall to project across the opening thereof, a flap carried by said flap carrying bar and means supported on the top of the transverse walls for saturating said flaps, substantially as shown and described.

9. In a machine of the class described, comprising a main frame consisting of side bars and a series of transverse walls, each having an opening for the passage of the plant, a bottom for said machine having a longitudinal passage there-through, adjustable brackets secured to one face of each of said transverse walls, a rod joining the brackets on each transverse wall and spaced from said wall, said rod projecting across the opening in said wall, a flap carrying bar also secured to one face of said transverse wall to project across the opening thereof, a flap carried by said flap carrying bar means supported on the top of the transverse walls for saturating said flaps, and a cutter carried by the said walls of said machine for entering the ground, substantially as shown and described.

10. In a machine of the class described, comprising a main frame consisting of side bars and a series of transverse walls, each having an opening for the passage of the plant, a bottom for said machine having a longitudinal passage there-through, adjustable brackets secured to one face of each of said transverse walls, a rod joining the brackets on each transverse wall and spaced from said wall, a flap carrying bar also secured to one face of said transverse wall to project across the opening thereof, a flap carried by said flap carrying bar means supported on the top of the transverse walls for saturating said flaps, and means for adjusting the side of the openings of the transverse walls, substantially as shown and described.

GEORGE W. WATKINS.

Witnesses:
J. HOLMES ANDERSON,
WM. JUDSON FINKS.